United States Patent [19]

Kadi

[11] 3,730,134

[45] May 1, 1973

[54] PNEUMATIC WAFER SPINNER AND CONTROL FOR SAME

[76] Inventor: Frank G. Kadi, 282 Walker Drive, Mountain View, Calif. 94040

[22] Filed: Dec. 17, 1970

[21] Appl. No.: 99,149

[52] U.S. Cl. .......................... 118/6, 51/235, 118/50, 118/52, 279/3
[51] Int. Cl. .............................................. B05c 11/10
[58] Field of Search ...................... 118/50, 50.1, 500, 118/503, 52–57; 117/101; 279/3; 51/235; 269/21; 415/503; 308/9, 1 A; 294/64 A; 214/1 BS; 95/1 NQ; 355/1 NQ; 74/5.7, 5; 188/182, 761, 187, 271

[56] References Cited

UNITED STATES PATENTS

| | | | |
|---|---|---|---|
| 3,538,883 | 10/1970 | Polin | 118/52 X |
| 2,953,483 | 9/1960 | Torok | 118/48 X |
| 3,582,228 | 6/1971 | Tomita et al. | 415/503 X |
| 3,426,727 | 2/1969 | Balain et al. | 118/52 |
| 3,456,875 | 7/1969 | Hein | 415/503 X |
| 3,412,976 | 11/1968 | Arneson, Jr. | 415/503 X |
| 3,039,623 | 6/1962 | Sehn et al. | 294/64 A UX |
| 3,219,380 | 11/1965 | Carliss | 294/64 A UX |

*Primary Examiner*—Morris Kaplan
*Attorney*—Harry E. Aine and William J. Nolan

[57] ABSTRACT

A pneumatic wafer spinner and pneumatic control for same are disclosed. The pneumatic wafer spinner includes a vacuum chuck affixed to a spindle with the vacuum supplied to the chuck from a venturi disposed in the spindle and supplied with a flow of fluid, such as gas, under pressure. The chuck is rotated by means of a pneumatic turbine. Pneumatic bearings provide support for the spindle. Exhaust back pressure on the turbine is sensed and fed to a pilot valve for controlling the speed of the spindle and chuck. A pneumatic accumulator timer is employed for operating a pneumatic clutch for selectively braking rotation of the chuck and spindle after an elapsed time determined by the accumulator.

8 Claims, 1 Drawing Figure

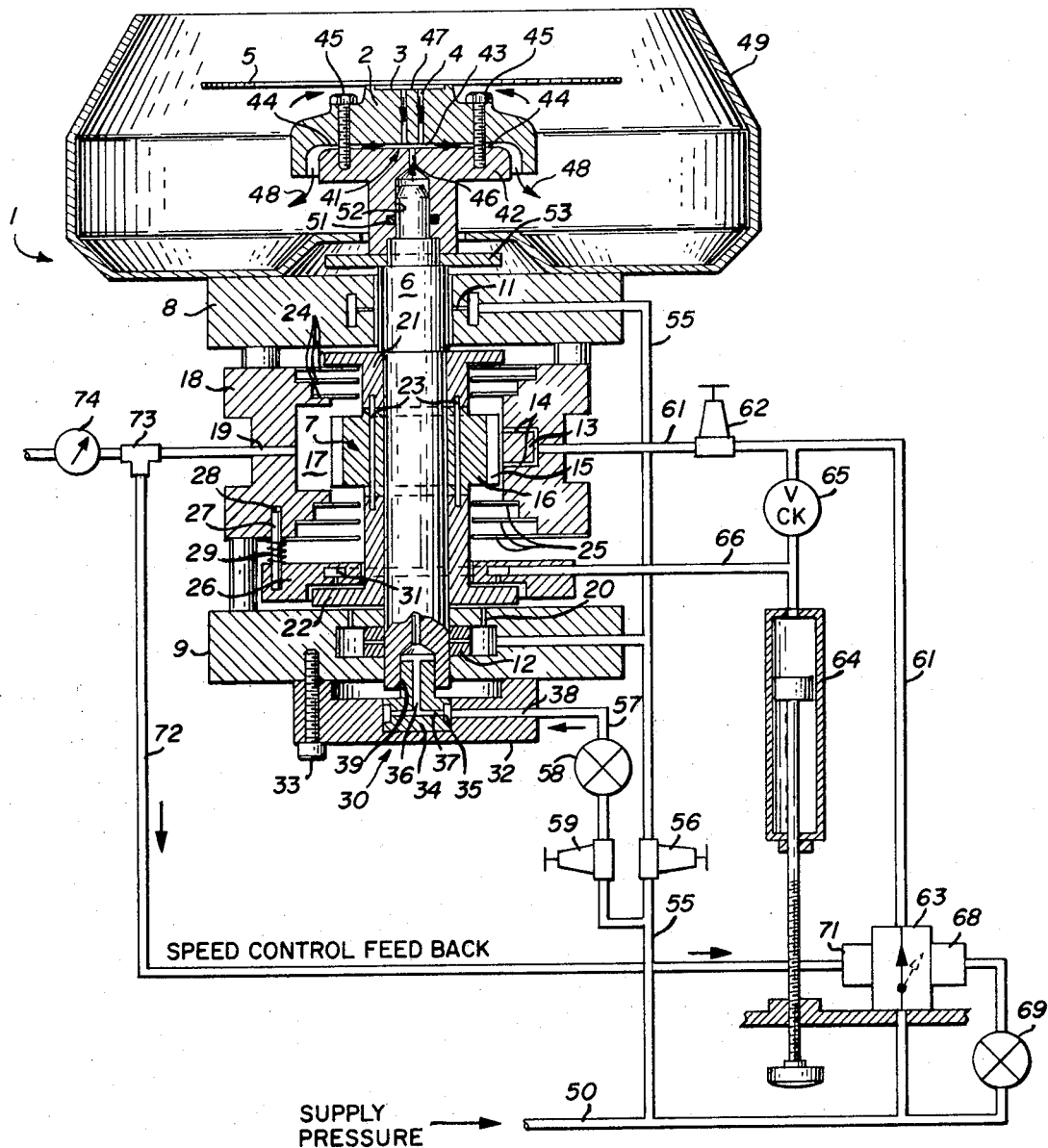

3,730,134

PNEUMATIC WAFER SPINNER AND CONTROL FOR SAME

DESCRIPTION OF THE PRIOR ART

Heretofore, wafer spinners employing vacuum chucks have been disclosed. Such wafer spinners have typically employed electrical motors for spinning the vacuum chuck at a relatively high speed. Vacuum was drawn on the chuck by a vacuum pump connected to the chuck via a hollow spindle. In other embodiments, an impeller was coupled to the spindle and/or chuck for drawing a vacuum on the chuck when the chuck and impeller reached operating speed. Such prior art wafer spinners are disclosed in U.S. Pat. No.: 3,389,682, issued June 25, 1968; U.S. Pat. No. 3,426,727, issued Feb. 11, 1969; and IBM Technical Disclosure Bulletin, Volume 5, No. 5 of October, 1962, pages 7 and 8.

One of the problems with these prior art wafer spinners is that they all employ electrical motors for driving the chuck at a relatively high speed, as of 2,000 to 15,000 rpm. Wafer spinners are used during the manufacturing process of semi-conductor devices wherein the wafer, which can vary from one-half inch to 3 inches in diameter is coated with photoresist material or the like by depositing a drop or two of the material in the center of the wafer and then spinning the wafer at high speed to spread the coating material uniformly over the surface of the wafer. Quite often the photoresist material or a coating material is flammable or explosive and the use of such materials around vacuum pumps and electrical motors creates a hazard as to fire and possible explosion. Moreover, the use of a vacuum pump for drawing a vacuum on the chuck through the hollow spindle creates a substantial maintenance problem as the photoresist material, solvents and the like are quite often drawn into the vacuum plumbing and vacuum pump rendering the system inoperative.

SUMMARY OF THE PRESENT INVENTION

The principal object of the present invention is the provision of an improved wafer spinner and control for same.

One feature of the present invention is the provision of a pneumatic turbine for spinning the chuck, whereby hazards created by the use of an electrical motor for driving the chuck are eliminated.

Another feature of the present invention is the provision of a venturi carried from the spindle for supplying the vacuum to the chuck, whereby the requirement for a vacuum pump is eliminated and maintenance problems associated therewith substantially reduced.

Another feature of the present invention is the same as any one or more of the preceding features including the provision of the pneumatic clutch and timer serving to time and selectively couple the spindle to a braking member for braking rotation of the spindle and chuck.

Another feature of the present invention is the same as any one or more of the preceding features including the provision of pneumatic bearings rotatably supporting the spindle and chuck via the intermediary of a cushion of gas in the pneumatic bearing.

Other features and advantages of the present invention will become apparent upon perusal of the following specification taken in connection with the accompanying drawings wherein:

BRIEF DESCRIPTION OF THE DRAWING

The drawing is a longitudinal sectional view, partly in schematic block and line diagram form, depicting the pneumatic wafer spinner and control system incorporating features of the present invention.

DESCRIPTION OF THE PREFERRED EMBODIMENTS

Referring now to the drawing, there is shown a pneumatic wafer spinner 1 incorporating features of the present invention. The wafer spinner 1 includes a vacuum chuck 2 having an upper holding surface 3 perforated by one or more vacuum lines 4 for drawing a vacuum on the holding side of a wafer 5, which is to be held to the chuck 2 via atmospheric pressure.

The chuck is carried from a hollow spindle 6 forming the drive shaft of a pneumatic turbine 7 which serves to drive the chuck and attached wafer 5 at relatively high angular velocity, as of 2,000 to 15,000 rpm. The turbine 7 is supported between two spaced plates 8 and 9 through which the spindle 6 passes. The spindle 6 is rotationally supported in pneumatic journal bearings 11 and 12 provided in plates 8 and 9, respectively.

The pneumatic turbine 7 includes a stator portion 13 having two axially spaced sets of jets 14 for directing the working fluid against the blades 15 of an impeller 16. The impeller 16 and spindle 6 are eccentrically located in a central chamber 17 of the turbine housing 18, which also contains the stator 13. The stator 13, is located, in the housing 18, very close to the impeller blades 15, whereas the spacing from the diametrically opposed portion of the impeller to the chamber 17 is increased to provide an expansion chamber portion. An exhaust port 19 communicates through the wall of the housing 18 in the region of the expansion chamber portion.

A pair of flanged bushings 21 and 22 are affixed to the spindle 6, as by set screws. A plurality of axially directed dowel pins 23 interconnect the axially spaced bushings 21 and 22 and pass through aligned bores in the impeller 16 for fixedly securing the impeller 16 to the spindle 6. Two sets of dynamic seal blades 24 and 25, such as opposing Acme threads or thin sealing blades, are disposed at the opposite ends of the turbine housing 18 in dynamic sealing relation with the bushings 21 and 22 for providing a dynamic gas-tight seal between the housing 18 and the spindle 6. A spindle pneumatic thrust bearing is provided between plate 9 and lower bushing 22, such bearing being supplied with gas from journal bearing 12 via axial passageway 20.

A braking disc 26 is carried from the lower wall of the turbine housing 18 via the intermediary of a plurality of axially directed pins 27 slideable within axially directed bores 28 provided in the lower wall of the turbine housing 18. Compression springs 29, provided between the braking disc 26 and the turbine housing 18, spring bias the braking disc member 26 against the lower flange of the flanged bushing 22 for braking rotation of the spindle 6.

A pneumatic thrust bearing 31 is provided in the braking disc member 26 to provide thrust bearing support for the braking member 26 relative to the bushing 22. The thrust bearing 31 operates against the spring bias of the braking member 26 such that when a pneumatic pressure is supplied to the pneumatic thrust bearing 31 braking member 26 is held away from the bushing 22 to permit free unbraked rotation of the spindle 6.

Pneumatic pressure is applied to the central bore within the spindle 6 via a sealed rotary joint 30 provided at the lower end of the spindle 6. More specifically, the rotary joint 30 includes a housing 32 affixed to the lower plate 9 via cap screws 33. A graphite insert 34 is carried within a recess in the housing 32. The insert 34 includes an annular chamber 35 surrounding an axially directed bore 36. Bore 36 is connected in gas communication with the annular chamber 35 via a plurality of radially directed bores 37. Pneumatic pressure is supplied to chamber 35 via an input passageway 38 passing through the housing 32 and intersecting with the chamber 35. The graphite insert extends into a counterbore 39 in the end of the spindle 6 and makes the gas-tight rotary seal with the spindle 6.

A venturi 41 is provided in the spindle 6 at the base of the vacuum chuck 2 for drawing a vacuum on the vacuum lines 4. More specifically, the venturi 41 includes an upper body portion formed by chuck 2 and a lower body portion 42 axially spaced apart, as by 0.007 inch, to define a radially directed venturi gap 43 between the lower body portion 42 and the upper body portion 2. The spacing for the venturi gap 43 is provided by washers 44 having a thickness of 0.007 inch disposed around screws 45 passing axially through the chuck 2 and into the lower body portion 42 for holding the chuck and lower body portion 42 of the venturi together. The lower body portion 42 include an axial directed bore 46, as of 0.080 inch in diameter, which is supplied with gas under pressure, as of air at 20 psi, via the central bore in the spindle 6.

Passageway 46 intersects with the venturi gap 43 substantially at the center thereof and the upper portion 2 of the venturi 41 blocks the axially directed flow of the pneumatic fluid and directs such fluid into the radial direction through the venturi gap 43. The vacuum lines 4, as of 0.048 inch in diameter and 0.5 inch long, intersect the venturi gap 43 in a region of laminar flow, such gap and passageway being dimensioned and positioned, to provide laminar flow. The intersected region of the venturi gap 43 also has a pneumatic pressure therein at less than atmospheric pressure. In a typical example, there are two to six vacuum lines 4 intersecting the venturi gap and passing axially of the chuck to a centrally recessed portion 47 in the holding surface 3 of the chuck 2. In this manner, the vacuum lines 4 evacuate the recess 47 such that a relatively large area of reduced pressure is provided on the holding side of the wafer such that the atmospheric pressure over this working area is adequate to rigidly hold the wafer 5 to the holding surface of the chuck 2.

The pneumatic fluid exits from the venturi gap in the axial direction, as indicated by arrows 48. A stationary splash guard 49, as of sheet metal, with a disposable insert surrounds the chuck 2 and is carried from the upper base plate 8 via a plurality of screws, not shown.

The lower member 42 of the venturi 41 includes an axially directed bore 52, to receive the upper end of the spindle 6. An O-ring 51 makes a seal between the inner bore 52 in the venturi body 42 and the upper end of the spindle 6. A radially directed collar 53 is carried from the spindle 6 and serves to deflect contaminants from the bearing 11.

A pneumatic working fluid, such as air, is supplied to the wafer spinner 1 from a pneumatic pressure supply 50, such as an air compressor. Pneumatic fluid is continuously supplied to the bearings 11 and 12 via input lines 55 connected to the pressure supply 50 via the intermediary of a pressure regulator 56 regulating low pressure, as of 5 psi. The pneumatic fluid is also supplied to the spindle 6 and to the venturi 41 via line 57 connected to input line 55 via the intermediary of a manually closeable normally open valve 58 and a pressure regulator 59, which regulates the pneumatic pressure to the venturi 41 to about 20 psi.

Pneumatic fluid for driving the turbine 7 is supplied to the turbine 7 via input line 61, which is connected to the supply pressure 50 via regulator 62 and a main valve 63. The regulator 62 regulates the pressure to the jets of the turbine to between 10 and 50 psi depending upon the desired speed of rotation of the spindle 6, and chuck 2. An adjustable accumulator 64 is connected to the turbine supply line 61 via the intermediary of a check valve 65, which is set such that pressure supplied to line 61 is directed into the accumulator but check valve prevents a loss of pressure from the regulator to the turbine supply line 61. The thrust bearing 31 of the brake 26 is supplied with pneumatic fluid from the accumulator 64 and turbine supply line 61 via input line 66.

The main valve 63 includes a reset pilot valve portion 68 connected to the supply 50 via the intermediary of a manually operated normally closed valve 69. The main valve 63 also includes a shut-off pilot valve portion 71 connected to the output exhaust port 19 of the turbine 7 via the intermediary of line 72 and a tee connection 73. A needle exhaust valve 74 is connected at the exhaust port 19 of the turbine 7 for controlling the back pressure on the expansion portion of the chamber 17 of the turbine 7.

In operation, valve 58 is normally open such that a vacuum is being drawn on the holding surface of the vacuum chuck 2. The wafer 5 is positioned on the holding surface of the chuck 2 and is held thereto via the vacuum drawn on the holding side thereof. The material to be coated onto the wafer is deposited thereon. The reset pilot control valve 69 is then momentarily opened to cause reset pilot valve 58 to open the main valve 63 to provide fluid pressure to the turbine 7 causing the spindle 6 and the wafer 5 to be rapidly accelerated to the desired operating speed as determined by the setting of regulator 62 and exhaust needle valve 74. As the impeller 16 reaches the desired operating speed, the fluid pressure dropped through the turbine 7 will reduce to a relatively low value such that the pressure sensed and fed back to the shut-off pilot valve 71 via line 72 has some pressure relative to atmospheric pressure, such as 1 psi. When this pressure differential is reduced to 1 psi, the shut-off valve 71 is actuated to shut-off the supply of pneumatic fluid to the turbine.

When the main valve 63 was opened to supply pneumatic fluid to turbine 7 it also supplied pneumatic fluid to the thrust bearing 31 to allow free rotation to the spindle 6. The accumulator 64 was also filled to a volume as determined by the setting of the plunger in the accumulator 64. When the main valve 63 is closed by the shut-off pilot 71 pneumatic fluid continues to be supplied to the thrust bearing 31 via the pneumatic supply in the accumulator 64, such that the chuck continues to rotate for a predetermined period of time, for example, 10 seconds to 3 or 4 minutes, as determined by the setting of the accumulator 64. When the supply of pneumatic fluid in the accumulator 64 is exhausted, action of the thrust bearing 31 is overcome by springs 29 urging braking plate 26 into engagement with the lower bushing 22 causing the spindle 6 and wafer 5 to be braked to a gradual and smooth stop. The chuck control valve 58 is then momentarily depressed cutting off the supply of pneumatic pressure to the venturi 41, such that the wafer 5 can be easily removed by tweezers and the wafer spinner 1 is then in a condition to restart the cycle.

The advantage of the pneumatic wafer spinner 1 of the present invention is that it is entirely pneumatic requiring no electrical motors or vacuum pumps. As a consequence, the hazard of fire and explosion is substantially reduced. Moreover, the bearings, turbine, and clutch all are operated at a positive fluid pressure, such that contamination of the bearings, seals, etc. is eliminated, thereby reducing maintenance. Moreover, use of the pneumatic turbine 7 eliminates vibration often encountered when using electrical motors. In addition, the venturi and vacuum chuck are readily removed as a unit by merely sliding the chuck and venturi off the end of the spindle 6 such that the vacuum passageways 4 and the venturi gap 43 may be easily cleaned and readily replaced.

Since many changes could be made in the above construction and many apparently widely differing embodiments of the invention could be made without departing from the scope thereof, it is intended that all matter contained in the above description or shown in the accompanying drawings shall be interpreted as illustrative and not in a limiting sense.

RELATED CASES

The pneumatic venturi 41 and use thereof in a vacuum chuck is disclosed and claimed in copending U.S. Pat. application Ser. 99,150 filed 17 Dec. 1970 and now abandoned.

What is claimed is:

1. In a wafer spinner of the type for applying a flowable liquid substance to one surface of a workpiece and for spinning the workpiece to cause the liquid to spread uniformly over the surface of the workpiece, vacuum chuck means having a workpiece holding surface to which a workpiece to be coated uniformly is to be held by atmospheric pressure applied to one side of the workpiece and working against less than atmospheric pressure applied to the holding surface side of the workpiece through a perforated portion of said holding surface of said chuck, spindle means affixed to said chuck for rotating same, pneumatic turbine means having impeller and stator means, and said impeller means being affixed to said spindle means for rotating said spindle and chuck, venturi means carried from said spindle, gas passageway means for supplying gas at positive pressure to said venturi means, gas passageway means interconnecting said chuck and said venturi means for supplying the less than atmospheric pressure to said vacuum chuck means from said venturi for holding the workpiece to said chuck.

2. The apparatus of claim 1 including, pneumatic bearing means for rotatably supporting said spindle means via the intermediary of a cushion of gas in said bearing means.

3. The apparatus of claim 1 including pneumatic sensor means for sensing when said impeller has reached a predetermined angular velocity and for reducing the pneumatic energy supplied to said turbine means.

4. The apparatus of claim 1 including, a braking member, pneumatic clutch means for selectively coupling said spindle to said braking member, pneumatic timer means in fluid coupled relation to said pneumatic clutch means for causing said clutch to couple said spindle to said braking member for braking rotation of said spindle after a certain lapsed time which is a function of the time setting of said pneumatic timer means.

5. The apparatus of claim 4 wherein said pneumatic clutch means includes a pneumatic thrust bearing means for providing a cushion of gas between said braking member and a thrust bearing portion of said spindle, and wherein said pneumatic timer means controls flow of gas to said thrust bearing means.

6. The apparatus of claim 1 wherein said venturi means is disposed in said spindle intermediate said chuck means and said impeller means.

7. The apparatus of claim 3 including, gas conduit means for interconnecting said stator means and a source of gas, valve means disposed in said gas conduit for controlling the flow of pneumatic energy to said turbine means, and wherein said pneumatic sensor means reduces the flow of pneumatic energy to said turbine by substantially closing said valve means for shutting off the flow of gas from the source to said stator of said turbine.

8. The apparatus of claim 6 including detachable gas tight coupling means for detachable coupling said spindle to said chuck and venturi means to facilitate removing said chuck and said venturi from said spindle.

* * * * *